(12) United States Patent
McFarland et al.

(10) Patent No.: US 10,448,571 B1
(45) Date of Patent: Oct. 22, 2019

(54) UNIVERSAL VINEYARD TILLAGE AND SPRAY CARRIER

(71) Applicants: Kelly McFarland, Gonzales, CA (US); Claude Brown, Lodi, CA (US)

(72) Inventors: Kelly McFarland, Gonzales, CA (US); Claude Brown, Lodi, CA (US)

( * ) Notice: Subject to any disclaimer, the term of this patent is extended or adjusted under 35 U.S.C. 154(b) by 7 days.

(21) Appl. No.: 15/381,079

(22) Filed: Dec. 15, 2016

(51) Int. Cl.
| | |
|---|---|
| A01D 46/28 | (2006.01) |
| A01B 39/19 | (2006.01) |
| A01B 49/00 | (2006.01) |
| A01M 17/00 | (2006.01) |
| A01M 7/00 | (2006.01) |
| A01G 17/02 | (2006.01) |

(52) U.S. Cl.
CPC ............ *A01D 46/285* (2013.01); *A01B 39/19* (2013.01); *A01B 49/00* (2013.01); *A01G 17/023* (2013.01); *A01G 17/026* (2013.01); *A01M 7/006* (2013.01); *A01M 17/008* (2013.01)

(58) Field of Classification Search
CPC ...... A01D 46/285; A01D 46/28; A01B 39/16; A01B 39/18; A01B 39/19; A01B 49/00; A01G 17/02; A01G 17/023; A01G 17/026; A01M 17/008; A01M 7/0069
See application file for complete search history.

(56) References Cited

U.S. PATENT DOCUMENTS

| | | | | |
|---|---|---|---|---|
| 3,157,234 A | * | 11/1964 | Bezzerides | A01B 39/16 172/142 |
| 3,683,547 A | * | 8/1972 | Harden | A01G 25/09 118/323 |
| 3,685,264 A | * | 8/1972 | Littau | A01D 46/28 56/209 |
| 3,686,842 A | * | 8/1972 | Littau | A01D 46/28 56/330 |
| 3,889,454 A | * | 6/1975 | Bruel | A01D 46/285 56/330 |
| 3,890,774 A | * | 6/1975 | Bruel | A01D 46/285 56/330 |
| 3,890,775 A | * | 6/1975 | Bruel | A01D 46/285 56/330 |
| 3,955,626 A | | 5/1976 | Taylor | |
| 4,171,723 A | * | 10/1979 | Hood | A01B 63/10 172/1 |

(Continued)

FOREIGN PATENT DOCUMENTS

| | | | | |
|---|---|---|---|---|
| DE | 3614867 A1 | * | 11/1986 | ............ A01D 46/26 |
| FR | 2287841 A1 | * | 5/1976 | ............ A01D 46/28 |

(Continued)

*Primary Examiner* — Alicia Torres
*Assistant Examiner* — Adam J Behrens
(74) *Attorney, Agent, or Firm* — Steven R. Vosen

(57) ABSTRACT

An apparatus for tending to rows of vines is presented which may be pulled, or driven, between a pair of rows of a vineyard. The apparatus includes implements to tend to the vines on both rows at the same time. The apparatus include a left portion that tends to a left row of vines and right portion that tends to a right row of vines. The portions are attached to the apparatus using linkages that permit the portions to adjust to changes in row spacing or the position of the apparatus between the rows. The apparatus also includes weeder assemblies that weed the ground between the vines while preventing damage to the vines, and a spray device for spraying the vines.

12 Claims, 14 Drawing Sheets

(56) References Cited

U.S. PATENT DOCUMENTS

| | | | | |
|---|---|---|---|---|
| 4,206,569 A * | 6/1980 | Randolph | ............. | A01M 7/006 |
| | | | | 172/6 |
| 4,241,569 A * | 12/1980 | Bobard | ................ | A01D 46/285 |
| | | | | 56/330 |
| 4,255,922 A * | 3/1981 | Hiyama | ................. | A01D 46/28 |
| | | | | 239/121 |
| 4,479,632 A * | 10/1984 | McIntire | ................. | B66C 23/48 |
| | | | | 254/10 B |
| 4,567,689 A | 2/1986 | Lemons | | |
| 4,640,365 A | 2/1987 | Schmidt | | |
| 4,821,807 A | 4/1989 | Trumm | | |
| 5,028,002 A * | 7/1991 | Whitford | ............ | A01M 7/0014 |
| | | | | 239/8 |
| 5,031,705 A * | 7/1991 | Clemens | ................ | A01B 39/16 |
| | | | | 172/233 |
| 5,074,108 A * | 12/1991 | Claxton | ................. | A01D 46/26 |
| | | | | 56/330 |
| 5,148,873 A | 9/1992 | Barnes et al. | | |
| 5,511,623 A | 4/1996 | Frasier | | |
| 5,582,255 A | 12/1996 | Nikkel et al. | | |
| 6,009,186 A * | 12/1999 | Gorretta | ................. | G01N 21/94 |
| | | | | 209/577 |
| 6,374,538 B1 * | 4/2002 | Morris | ................... | A01D 46/28 |
| | | | | 47/1.01 R |
| 6,769,238 B2 | 8/2004 | Pellenc et al. | | |
| 7,640,091 B2 * | 12/2009 | Berg | ...................... | A01D 46/28 |
| | | | | 56/328.1 |
| 2003/0033749 A1 | 2/2003 | Morris et al. | | |
| 2004/0083703 A1* | 5/2004 | Crinklaw | ............ | A01B 69/028 |
| | | | | 56/330 |
| 2007/0033914 A1* | 2/2007 | Scott | ................... | A01G 17/026 |
| | | | | 56/16.8 |

FOREIGN PATENT DOCUMENTS

| | | | | | |
|---|---|---|---|---|---|
| FR | | 2315221 A1 * | 1/1977 | ........... | A01D 46/285 |
| FR | | 2416638 A2 * | 9/1979 | ........... | A02D 46/285 |
| FR | | 2483168 A1 * | 12/1981 | ........... | A01D 46/005 |
| FR | | 2690312 A1 * | 10/1993 | ........... | A01D 46/28 |

\* cited by examiner

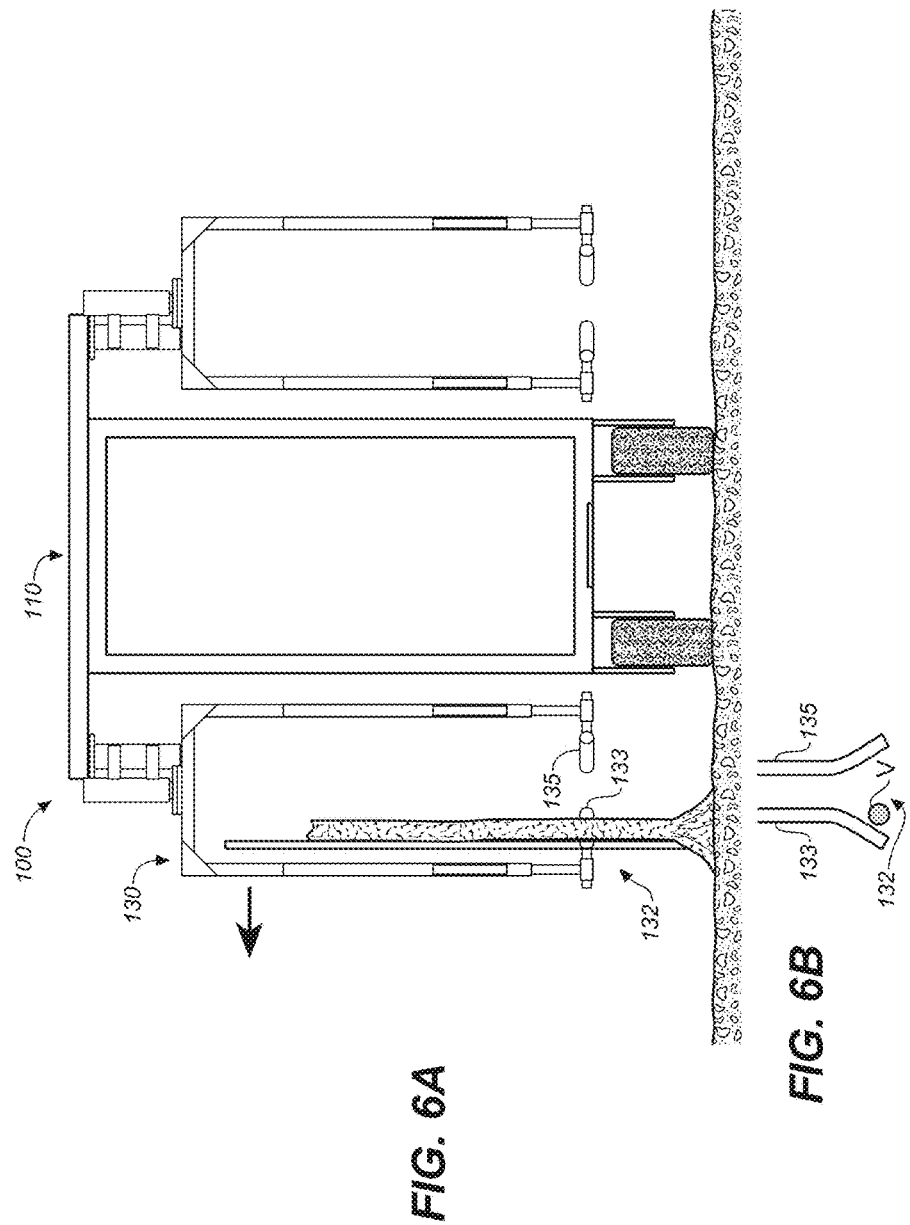

UNIVERSAL VINEYARD TILLAGE AND SPRAY CARRIER

BACKGROUND OF THE INVENTION

Field of the Invention

The present invention relates to the management of vineyards, and specifically to an apparatus for tending to two rows of vines simultaneously.

Discussion of the Background

Care of the vines, such as grapevines, includes tillage of soil, trimming, thinning and other removal of excess portions of the grape vine foliage, spraying vines and harvesting the grapes. Historically, these activities were performed manually along vineyards of approximately equally spaced rows of trellises on which grape vines are trained to grow.

Various mechanical aids have been developed for certain tending activities by machines that travel on the ground between adjacent rows. There exists a need, however, for a device that can tend to pairs of adjacent rows of vines, that can automatically respond to variations in row spacing, and which can tend to the soil and/or vines of the rows. Such a device should be compatible with agricultural practices and useful in existing vineyards.

BRIEF SUMMARY OF THE INVENTION

Embodiments described herein overcome the disadvantages of prior art by providing a device with a frame that supports a left row mechanism and a right row mechanism. The device is designed to be pulled, or driven, between a pair of rows of a vineyard, and to tend to the vines on both rows at the same time. Each mechanism independently senses the position of a row and moves the mechanism relative to the frame to keep it centered on its row.

Certain embodiments provide a device for the simultaneous tending of a left row of vines and an adjacent right row of vines. The device includes a frame having a front and a rear defining a longitudinal axis; a left linkage attached to the frame; a left portion supported by the left linkage, where the left portion includes a pair of left rails spaced apart to accept the left row of vines, where the left linkage allows the left portion to move relative to the frame with the pair of left rails aligned with the longitudinal axis, and where the left portion includes a left-side device for tending to the left row of vines; a right linkage attached to the frame; and a right portion supported by the right linkage, where the right portion includes a pair of rails spaced apart to accept the right row of vines, where the right linkage allows the right portion to move relative to the frame with the pair of right rails aligned with the longitudinal axis, and where the right portion includes a right-side device for tending to the right row of vines. When the device moves along the longitudinal axis with the left row of vines disposed between the pair of left rails and with the right row of vines disposed between the pair of right rails, the transverse spacing between the left portion and the right portion adjusts according to the spacing of the left row of vines and the right row of vines.

Certain other embodiments provide a device for the simultaneous tending of a left row of vines and an adjacent right row of vines. The device includes: a frame having a front and a rear defining a longitudinal axis; a left portion supported from a left side of the frame, where the left portion includes a pair of left rails spaced apart to accept the left row of vines, where the pair of left rails move relative to the frame with the pair of left rails aligned with the longitudinal axis, and where the left portion includes a left weeder assembly for weeding the soil of the left row of vines; and a right portion supported from a right side of the frame, where the right portion includes a pair of right rails spaced apart to accept the right row of vines, where the pair of right rails move relative to the frame with the pair of right rails aligned with the longitudinal axis, and where the right portion includes a right weeder assembly for weeding the soil of the right row of vines. When the device moves along the longitudinal axis with the left row of vines disposed between the pair of left rails and with the right row of vines disposed between the pair of right rails, the transverse spacing between the left portion and the right portion adjusts according to the spacing of the left row of vines and the right row of vines.

These features together with the various ancillary provisions and features which will become apparent to those skilled in the art from the following detailed description, are attained by the universal vineyard tillage and spray carrier of the present invention, preferred embodiments thereof being shown with reference to the accompanying drawings, by way of example only, wherein:

BRIEF DESCRIPTION OF THE SEVERAL VIEWS OF THE DRAWING

FIGS. 6A and 6B are a front and top view, respectively, of the apparatus of FIG. 1 in a first position as it adjusts to the location of a vine;

Figure 1:
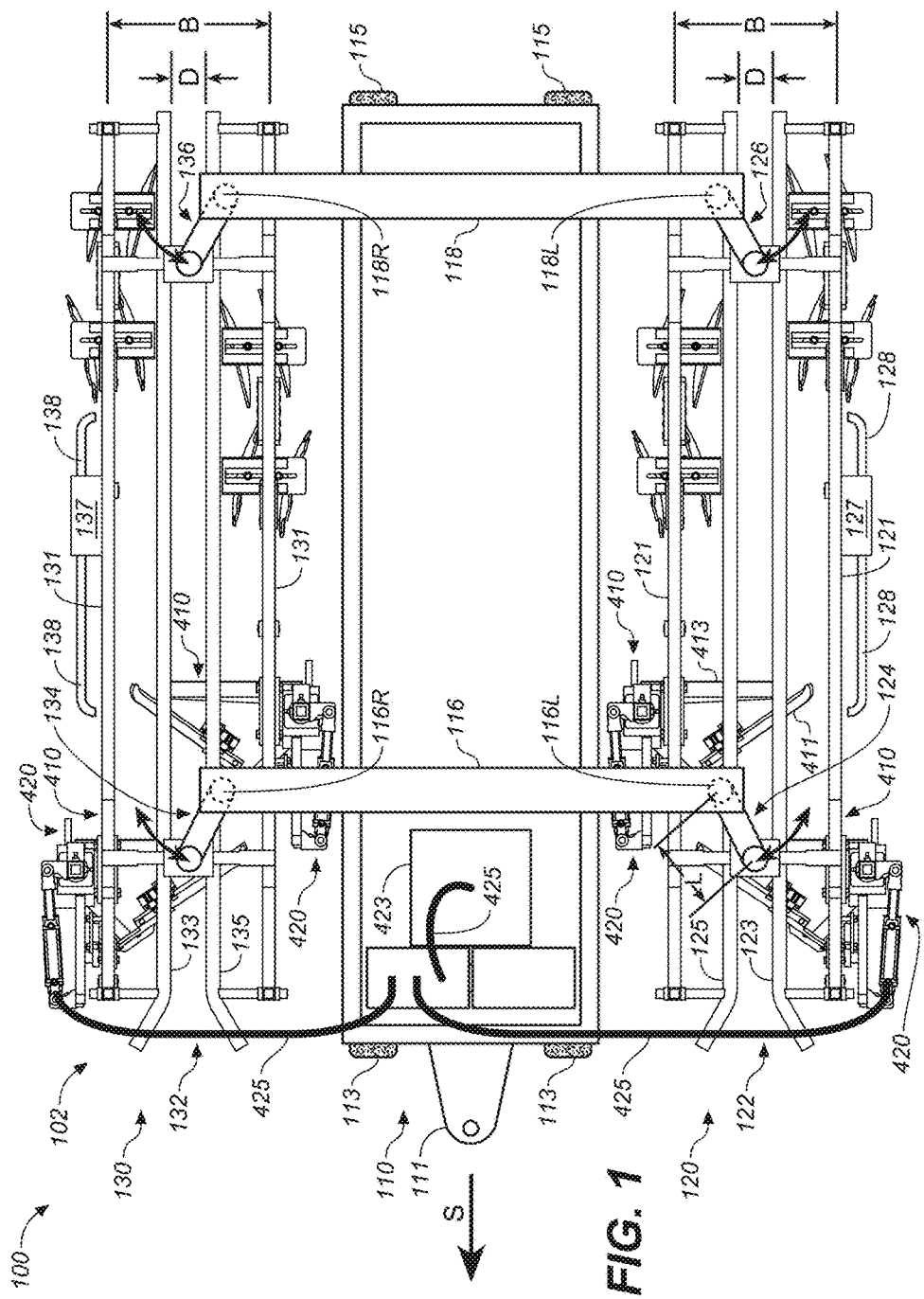
FIGS. 1, 2, and 3 are a side view, a rear view, and a top view respectively, of one embodiment of a universal vineyard tillage and spray carrier apparatus.

Reference symbols are used in the Figures to indicate certain components, aspects or features shown therein, with reference symbols common to more than one Figure indicating like components, aspects or features shown therein.

DETAILED DESCRIPTION OF THE INVENTION

Embodiments presented herein are apparatus for use in a vineyard, and is adaptable for tilling the soil, spraying the vines, and other activities related to growing grapes in a vineyard. One such apparatus is illustrated in FIGS. 1, 2, and 3 are a side view, a rear view, and a top view respectively, of one embodiment of a universal vineyard tillage and spray carrier apparatus 100.

Apparatus 100 includes a central portion 110, a left portion 120, and a right portion 130. Central portion 110 includes a frame 112, a pair of front wheels 113, a pair of rear wheels 115, a front transverse member 116 having a front left support 116L and a front right support 116R, and a rear transverse member 118 having a rear left support 118L and a rear right support 118R. As discussed subsequently in greater detail, central portion 110 also includes a trailer hitch 111 at a front 102 of apparatus 100 that is connectable to a trailer (not shown) for pulling apparatus 100, in the direction indicated by the arrow S in FIGS. 1 and 2. In an alternative embodiment, apparatus 100 or central portion 110 may be self-propelled, as being part of a tractor.

Left portion 120 includes a left frame 121 suspended from central portion 110 by a left linkage including a front left linkage 124 attached to front left support 116L and a rear left linkage 126 attached to rear left support 118L. Left frame 121 includes a region B for accepting vines and trellis as apparatus 100 is moved along a row of vines, and includes a pair of rails 123 and 125 that are spaced from one another by a distance D, and which form a V-shaped opening 122 at front 102 for accepting the vines.

Figure 2:
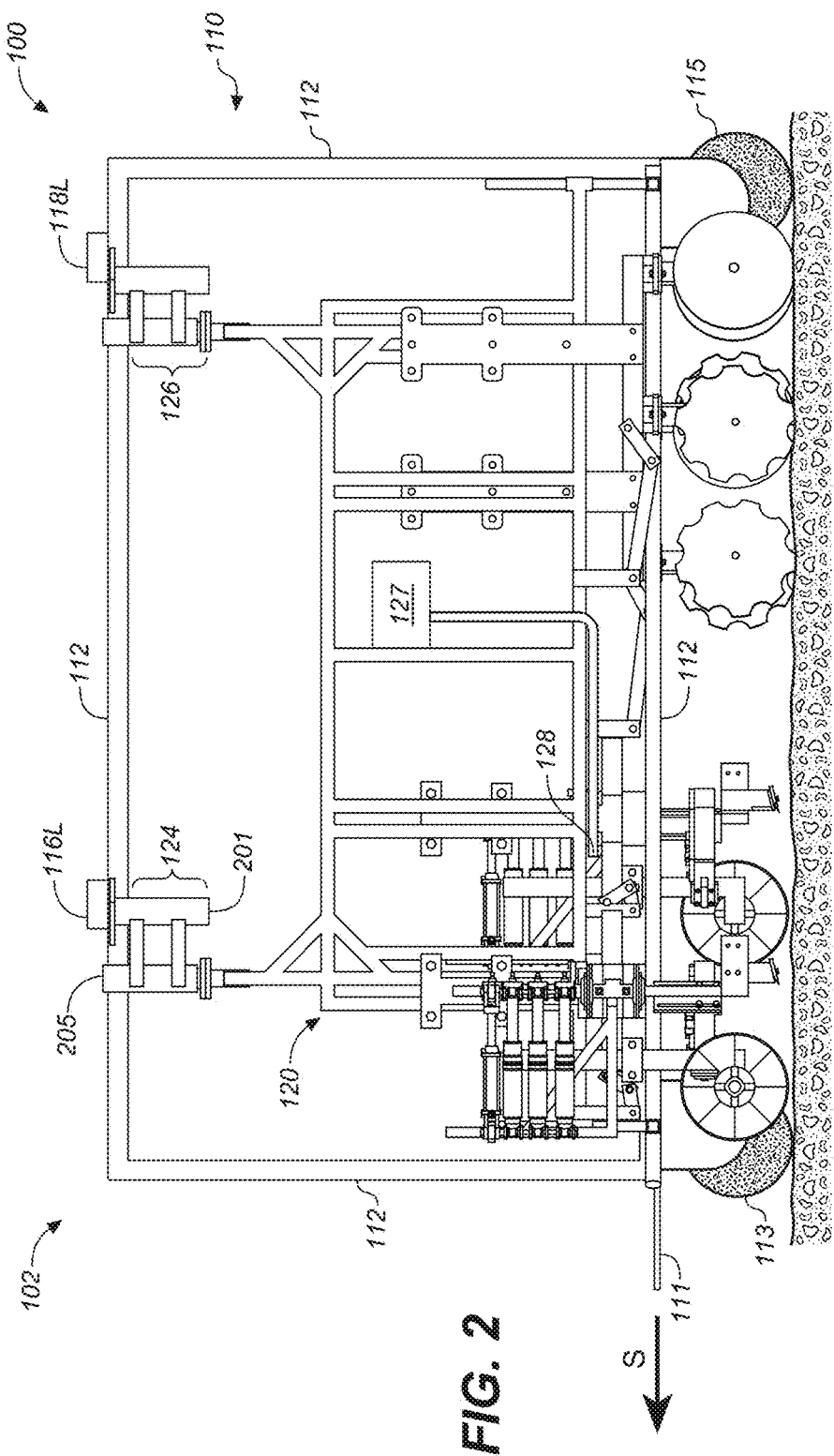
Figure 3:
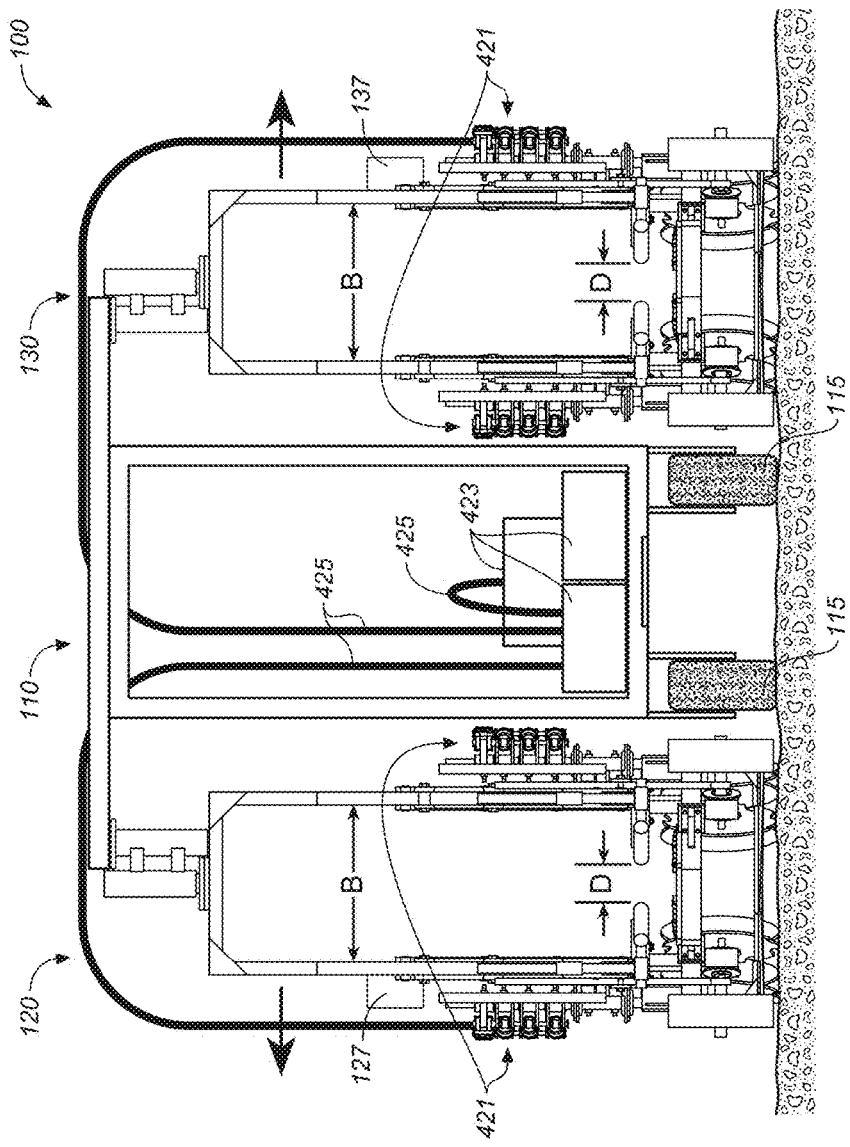
Figure 4:
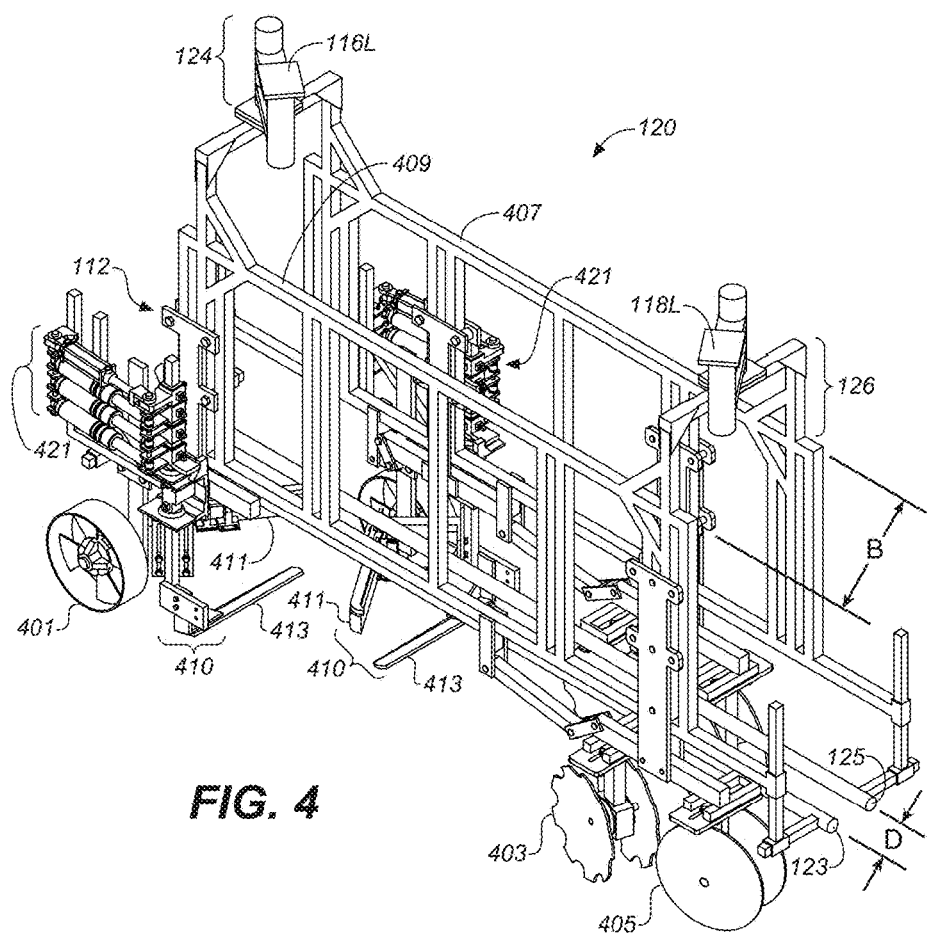
FIG. 4 is a perspective view of a left portion of the apparatus of FIGS. 1, 2, and 3.

FIG. 4 is a perspective view of left portion 120 of the apparatus of FIGS. 1, 2, and 3. Frame 121 includes an inner vertical portion 407 and an outer vertical portion 409 separated by distance W, and which extend towards the ground and support wheel 401 and blades 403, and 405. Portions 407 and 409 each support one of a pair of weeder assemblies 410 that are positioned near the ground and which include a hydraulic system 420 that further includes cylinders 421 for each weeder assembly, compressor and controller 423 for all of the weeder assemblies, hydraulic lines 425 that provide compressed air from compressor and controller 423 to each cylinder 421, and switches 803.

As shown in FIGS. 1 and 4, each weeder assembly 410 includes a sensor arm 411 and a blade 413, where the sensor arm is closer to front 102 than is the blade. As is discussed subsequently in greater detail, as apparatus 100 is moved through a vineyard, blade 413 is held in a position generally perpendicular to the direction of motion of apparatus 100 by hydraulic system 420 at slightly below ground level to cut weeds in its path. Thus, for example, when sensor arm 411 contacts an obstruction, which may be a vine, hydraulic system 420 is actuated to rotate blade 413 in a direction generally aligned with the direction of motion to prevent damage to the plant. When the plant no longer contacts sensor arm 411, hydraulic system 420 positions blade 413 to again be generally perpendicular to the direction of motion of apparatus 100.

Right portion 130 is substantially a mirror image of left portion 120 along the length of apparatus 100. Right portion 130 includes a right frame 131 that is suspended from central portion 110 by a front right linkage 134 attached to front right support 116R, and a rear right linkage 136 attached to rear right support 118R. Right frame 131 includes a pair of rails 133 and 135 that are spaced from one another and which form a V-shaped opening 132 at front 102. Right portion 130 also includes a pair of weeder assemblies 410 as described above regarding left portion 120.

The distance D for left portion 120 and right portion 130 accommodate the vines and any sakes or trellis of the vineyard and may be, for example and without limitation, from 4 inches to 12 inches, and may be for example, 4 inches, 6 inches, 8 inches, 10 inches, or 12 inches. In other embodiments, the distance D may be greater than 4 inches or greater than 12 inches, depending on the vines. In certain embodiments, the distance D is adjustable to preselected spacing or adjustable over a range of spacing to accommodate the vines and stakes of a specific vineyard. The spacing B of left portion 120 and right portion 130 is generally large enough to accommodate the vines and tresses, and may be, for example and without limitation, from 2 feet to 4 feet.

Left portion 120 and right portion 130 automatically and independently move the relative to central portion 100 to accommodate variations in row spacing which commonly occur in vineyards and to accept the vines of a row. Thus for example and without limitation, a vineyard may have a row spacing, W, between left row $R_L$ and right row $R_R$ of FIG. 5, where W may be from 6 feet to 12 feet, and which may be approximately constant along the rows. Thus, for example, row spacing W may vary along the length of the row as apparatus 100 moves in direction S between left row $R_L$ and right row $R_R$.

As noted above, left portion 120 is attached to front left support 116L by front left linkage 124 and to rear left support 118L by rear left linkage 126 and right portion 130 is attached to front right support 116R by front right linkage 134 and to rear right support 118R by rear left linkage 136. Each linkage 124, 126, 134 and 136 has essentially the same structure as linkage 124. As shown in FIG. 2, linkage 124 includes generally parallel portions 201 and 205 connected by arms 203. Portion 201 has a central shaft attached to front left support 116L, and is thus fixed central portion 110, and bearings (not shown) that allow arms 203 to rotate about the axis of portion 201. Portion 205 has a central shaft and bearings (not shown), where central shaft is part of frame 112. As described herein and illustrated in FIGS. 1, 2, 4, 6 and 7, the combination of front left linkage 124, rear left linkage 126, left portion 120 and central portion 110 form a left four-bar linkage that permits left portion 120 to remain parallel to central portion 110 while moving towards or away from the central portion, and front right linkage 134, rear right linkage 136, right portion 130, and central portion form a right four-bar linkage that permits right portion 120 to remain parallel to central portion, while moving towards or away from the central portion.

Figure 8A:
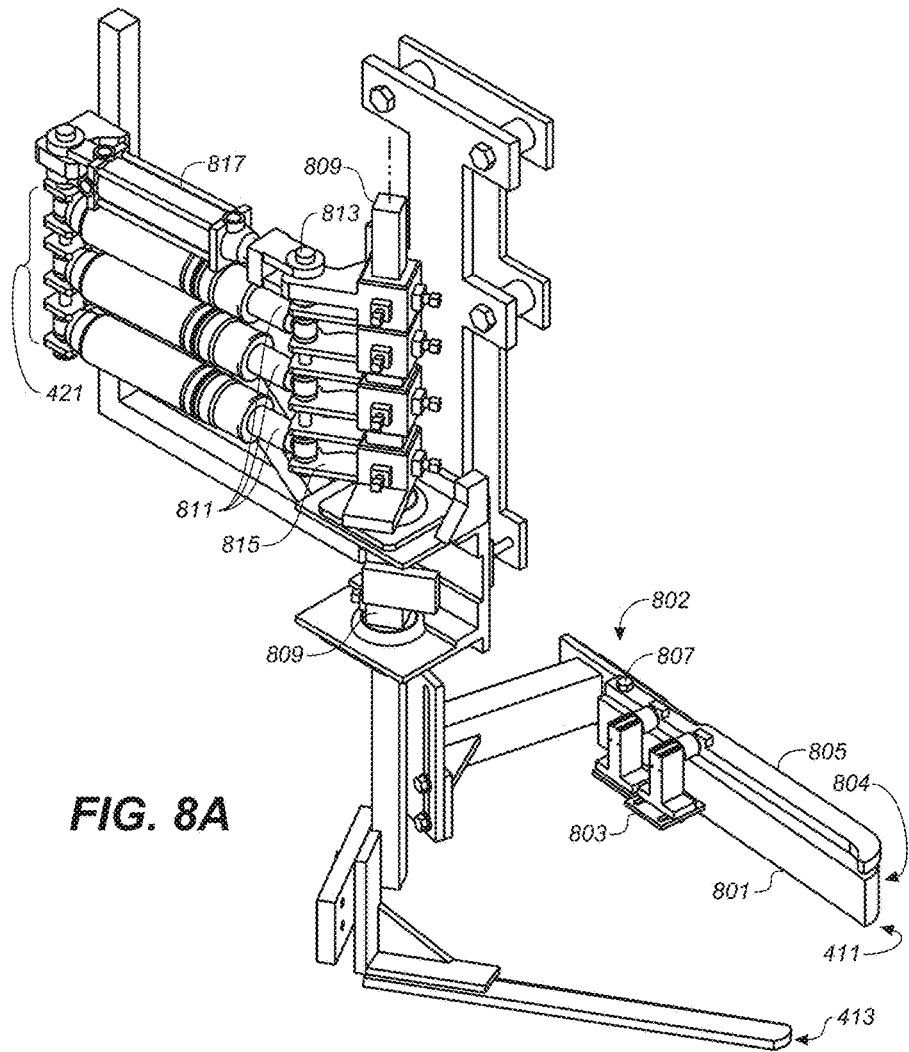
FIGS. 8A, 8B, and 8C are a perspective view, a side elevational view, and a rear elevational view, respectively, of one embodiment of a weeder assembly.

In certain embodiments, each weeder assembly 410 has an adjustable height so that an operator can set the height of blades 413 relative to wheels 401. This allows each weeder assembly 410 to be set to weed at height that is above, at, or below the ground position of wheels 410. Thus, in one embodiment, as illustrated in FIG. 8A, the components of each weeder assembly 410 are supported on a bracket 810. As illustrated in FIGS. 2 and 4, each bracket 810 is attached to left portion 120 and right portion 130. An operator may loosen the bolts attaching brackets 810 to left and right portions 120/130 and move weeder assembly 410 up or down, as illustrated for example in the two sided arrows in FIG. 2. In this way, the height of blades 413 relative to wheels 401 may be adjusted. The bolts attaching brackets 810 to left and right portions 120/130 may then be tightened. Blade 413 may thus be set a distance H above the bottom of wheel 410, as shown in FIG. 2, or may be set at the height of the bottom of wheel 410, or may be set a distance H below the bottom of wheel 410. The distance H may be, for example, 1, 2, 3, 4, or more inches above or below the bottom of wheel 410.

In certain embodiments, the length of arms 203, denoted as length L in FIG. 1, is the same for linkages 124, 126, 134 and 136. Left portion 120 and central portion 110 are thus connected by linkages 124 and 126 which rotate in unison, permitting the left portion to move towards or away from the central portion while maintaining rails 122 and 125 in the same, generally parallel orientation, relative to central portion 110. Likewise, right portion 130 and central portion 110 are thus connected by linkages 134 and 136 which also rotate in unison and independently from linkages 124 and 126, permitting the right portion to move towards or away from central portion 110 while maintaining rails 132 and 135 in the same, generally parallel orientation, relative to central portion 110.

Left portion 120 and right portion 130 optionally include an apparatus (not shown) which permits a user to adjust the distance between transverse members 116 and 118 and the bottom of each portion. This allows the user to select the height of blades 413 relative to the ground.

Left portion 120 and right portion 130 also include one or more devices for the spraying of the vines. Thus, for example, left portion 120 includes one or more reservoirs 127, each having one or more nozzles 128, and right portion 130 includes one or more reservoirs 137, each having one or more nozzle 138. The nozzles are located in several locations, which may be, for example and without limitation, directed to spray upwards from below the vines for pest control, on the outside of the vine for leafing, or on the outside of the vine for to provide liquids for foliage feeding. Thus, for example, reservoirs 127 and 137 having liquid products for insect control are located a position that is below the vines and pointed upwards towards the vine. In certain embodiments, multiple sets of reservoirs and nozzles are provided to provide liquids to accomplish several functions at the same time, such as feed and insect control or feeding the foliage and for pest control. In one embodiment, nozzles 128 and 138 are controlled switches 803 to sense when a vine is in the vicinity of the nozzles and to spray the vines.

Figure 5:
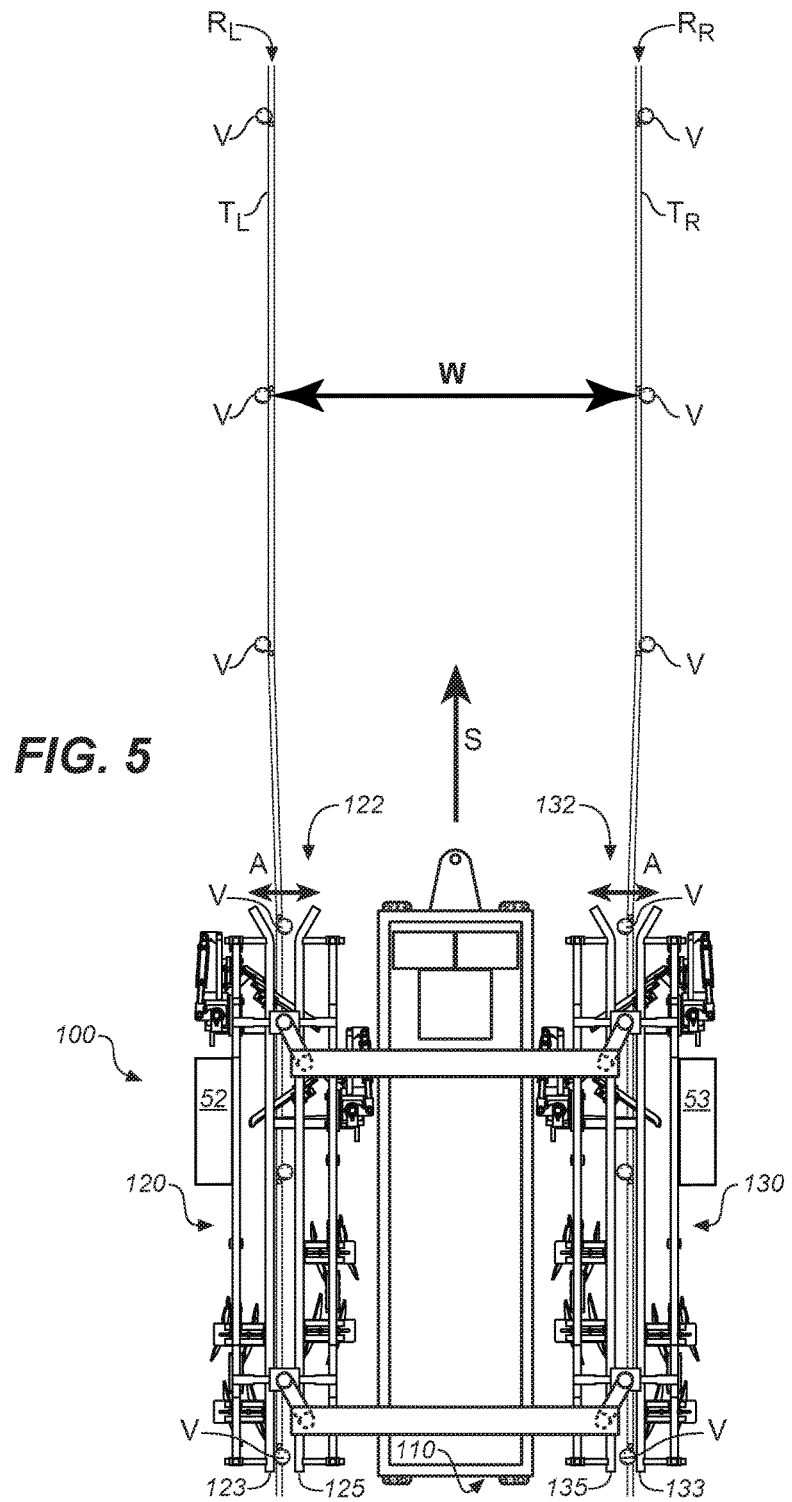
FIG. 5 is a top view of the apparatus of FIG. 1 which illustrates the apparatus moving between a pair of adjacent rows.

FIG. 5 is a top view of apparatus 100 which illustrates the apparatus moving between a pair of adjacent rows. Specifically, the figures shows apparatus 100 positioned between a left row, $R_L$, which includes a plurality of vines, V, and a left trellis, $T_L$, and a right row, $R_R$, which is spaced from left row $R_L$ by as row spacing W includes a plurality of vines, V, and a right trellis, $T_R$.

In generally, row spacing W may vary along the length of rows, making it difficult to tend to vines along the row. As shown in FIG. 5, apparatus 100 is positioned such that left row $R_L$ passes between rails 123 and 125 of left portion 120, and such that right row $R_R$ passes between rails 133 and 135 of left portion 130. The positioning may be accomplished, for example, by pulling apparatus 100 to the beginning of the rows with left row V-shaped opening 122 accepting row $R_L$ and V-shaped opening 132 accepting row $R_R$. Since left portion 120 and right portion 130 may move independently relative to central portion 110, the left and right portions may each independently move to the left or right of the central portion, as indicated by the arrows A, to accommodate variations in row spacing W as apparatus 100 moves along the rows. Specifically, since V-shaped opening 122 is situated near front left linkage 124 contact of rails 123 and 125 with a vine will act to move left portion 120 to the left or right to keep the vines centered between the rails. The same action occurs independently to move right portion 130 left or right to keep the vine centered between rails 133 and 135.

Figures 7A, 7B:
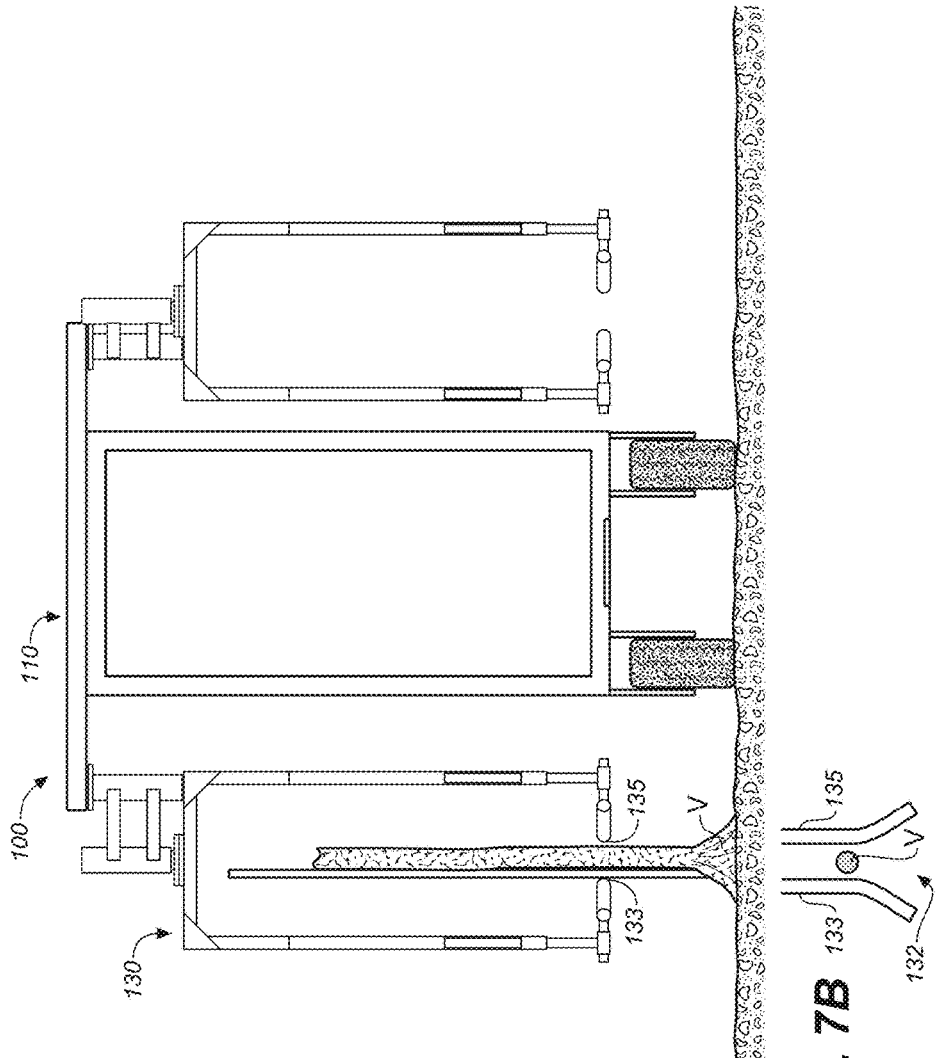
FIGS. 7A and 7B are a front and top view, respectively, of the apparatus of FIG. 1 in a second position as it adjusts to the location of a vine.

The response to apparatus 100 of changes in the relative spacing between a vine and central portion 110 is illustrated, for example, in FIGS. 6A and 6B, which are a front and top view, respectively, of apparatus 100 in a first position as it adjusts to the location of a vine, and in FIGS. 7A and 7B, which are a front and top view, respectively, of the apparatus in a second position as it adjusts to the location of a vine.

FIGS. 6A and 6B illustrate right portion 130 approaching a vine V of right row $R_R$ which is within V-shaped opening 132, but not between rails 133 and 135. As apparatus 100 moves past vine V, the vine contacts opening 132, imparting a lateral force on right portion 130 which causes the right portion to move to the right and accept the vine between rails 133 and 135, and illustrated in FIGS. 7A and 7B. Left portion 120 will likewise respond to vines of left row $R_L$. It is thus seen that left portion 120 and right portion 130 may independently laterally adjust their positions relative to central portion 110 and thus accommodate variations in row spacing W and/or the position of central portion 110 relative to right row $R_R$ and/or left row $R_L$.

Figure 8B:
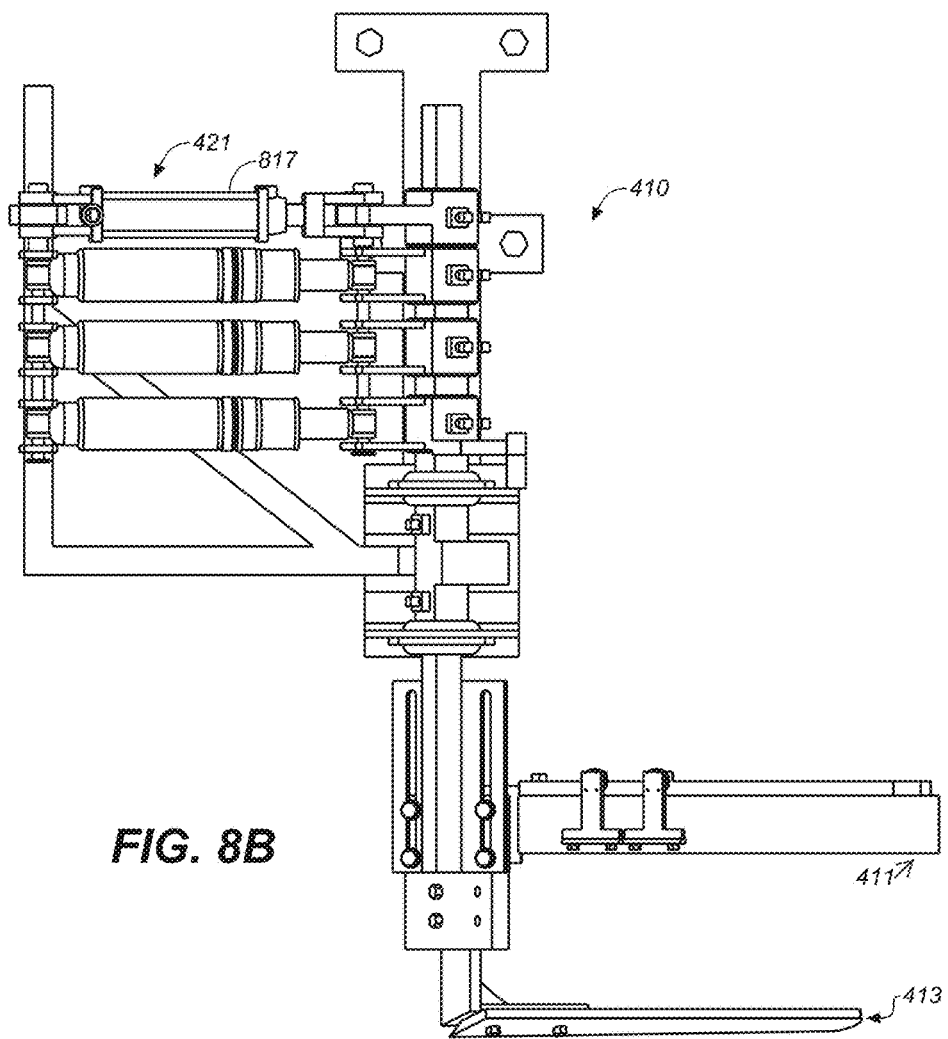
Figure 8C:
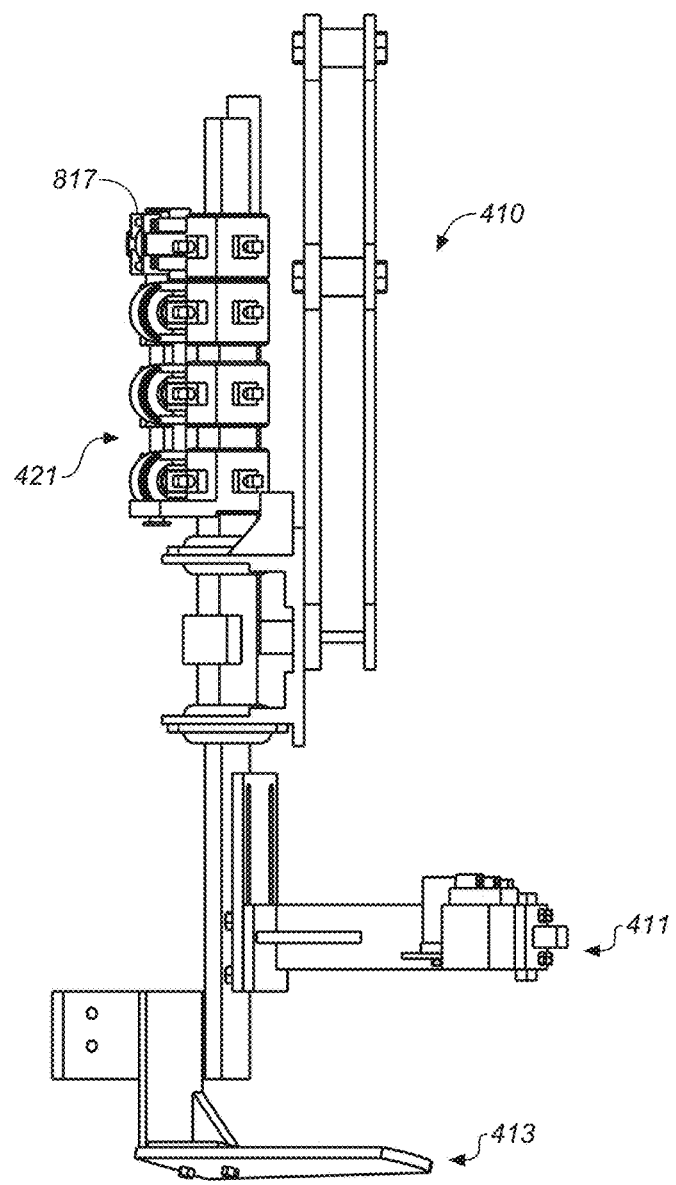

FIGS. 8A, 8B, and 8C are a perspective view, a side elevational view, and a rear elevational view, respectively, of one embodiment of weeder assembly 410. Sensor arm 411 extends from a proximal end 802 to a distal end 804, and includes a first arm 801, switches 803, and a second arm 805. Second arm 805 is rotatably attached by a bolt 807 to first arm 801 near proximal end 802. The proximal ends of first arm 801 and blade 412 are both connected to shaft 809, permitting the first arm and blade to rotate, in unison, about the axis of the shaft.

Cylinders 421 each have a piston 811 that is connected by pins 813 to coupler 815, which is attached to shaft 809. Compressor and controller 423 provide compressed air through hydraulic lines 425 to each cylinder 421. Optionally, a shock absorber 817 is provided in parallel with cylinders 421. Shock absorber 817, which may also be provided with compressed air from compressor and controller 423, may operate to further control motion of sensor arm 411 and blade 413.

As discussed subsequently, the motion of second arm 805 relative to first arm 801 can cause switches 803 to provide signals to hydraulic system 410 which affects how the first arm and blade 413 move. In one embodiment, the normal position of second arm 805 is such that switches 803 are not activated, causing hydraulic system 420 to provide a force on shaft 809 that maintains sensor arm 411 and blade 413 in a first configuration. When a force causes the distal end of the second arm to move towards first arm 801, switches 803 are then activated, releasing the force on shaft 809 and permitting sensor arm 411 and blade 413 to rotate about the shaft.

Weeder assemblies 410 may be used to weed the space between vines by sensing the approach of a vine and moving any blades out of the way to protect the vine. An example of the action of a pair of weed assemblies 410A and 410B moving at a velocity in direction S past a vine V is shown in the sequential top views of FIGS. 9A, 9B, 9C, and 9D. Specifically, weed assemblies 410A and 410B are each mounted on either left portion 120 or right portion 130, and are pulled with vines between the corresponding rails 123/125 or 133/135. Each one of weed assembly 410A and 410B is generally the same as weed assembly 410, and the various elements of weed assembly 410A and 410B are referred to with the reference numbers of weed assembly 410 with the corresponding suffix of A or B.

First, an operator may set the height of blades 413 relative to wheel 401, as described above. Thus for example, the blades may be set below the bottom of wheel 401 by placing blocks having a height of several inches on the ground, and then pulling apparatus 100 until the wheels 401 of left portion 120 and right portion 130 rests on the blocks. Brackets 810 may then be loosened and the weeder assembly lowered until the blades 413 touch or are near the ground.

Figure 9A:
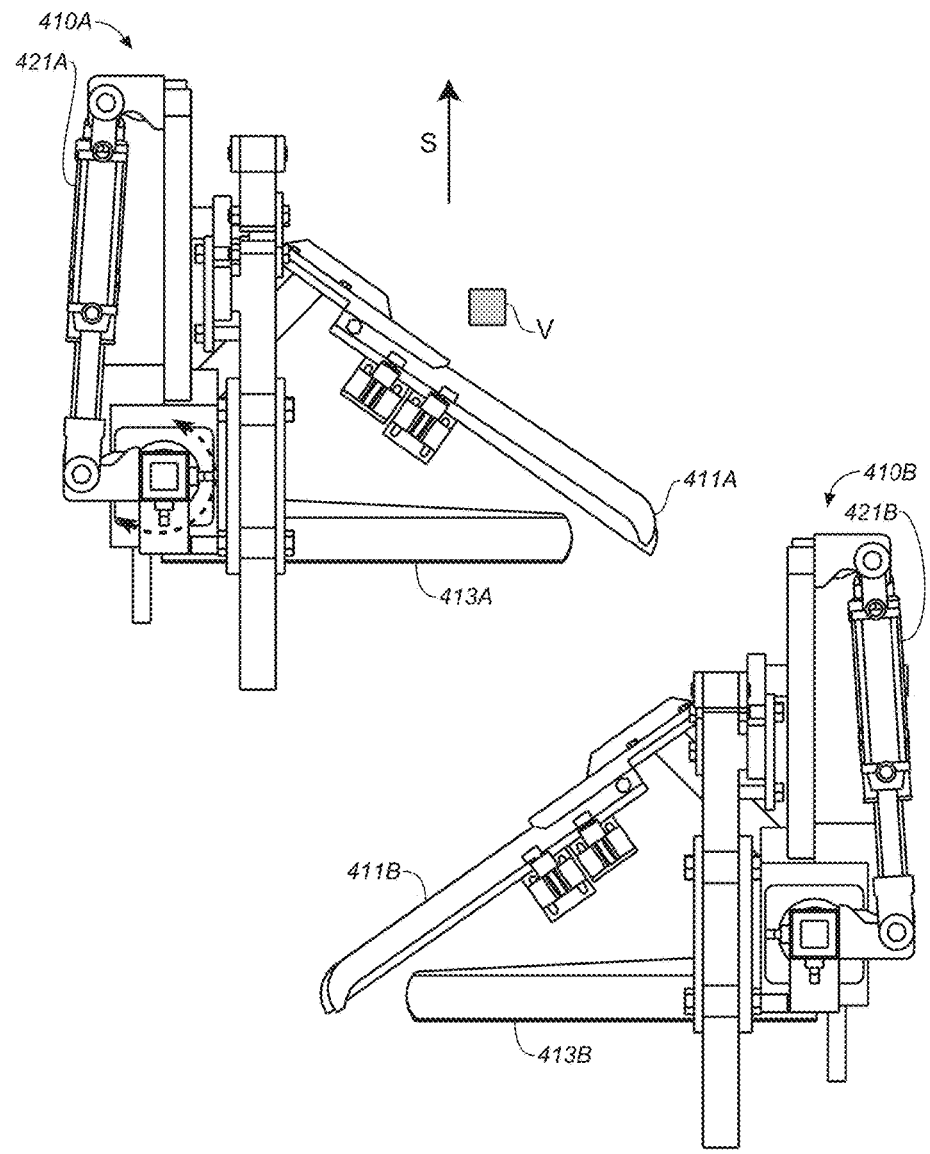
FIGS. 9A, 9B, 9C, and 9D are sequential top views of a pair of weed assemblies moving past a vine.

At a first time, as shown in FIG. 9A, weed assemblies 410A and 410B are both in a first configuration. That is, neither sensor arm 411A or 411B is in contact with vine V. Hydraulic system 420 provides a high pressure to cylinders 811A which holds blades 413A and 413B in an orientation that is generally perpendicular to the direction of velocity S. Blades 413A and 413B are both positioned, to overlap and thus, for example, to scrape the top of soil over which apparatus 100 is moving, effectively weeding the soil across the width of the row.

Figure 9B:
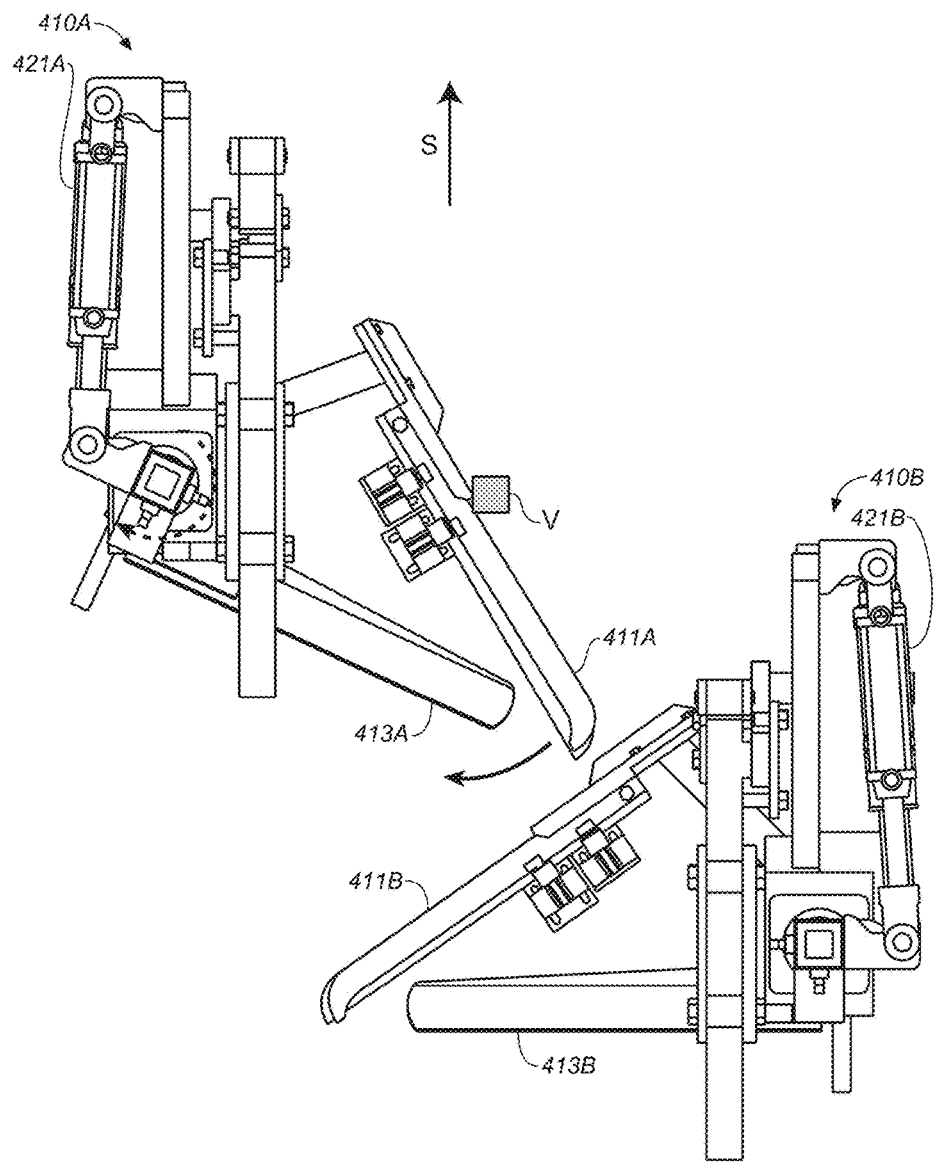

At a slightly later time, as shown in FIG. 9B, vine V has contacted sensor arm 411A, causing switch 803A to be activated. The activation of switch 803A causes release of the pressure in cylinders 421A, which permits sensor arm 411A, and thus blade 413A, to move away from vine V, as shown by the arrows, as apparatus 100 proceeds. Switch 803B is not activated, and thus hydraulic system 420 is providing full pressure to cylinders 421B, providing sufficient force to blade 413B to weed the soil.

Figure 9C:
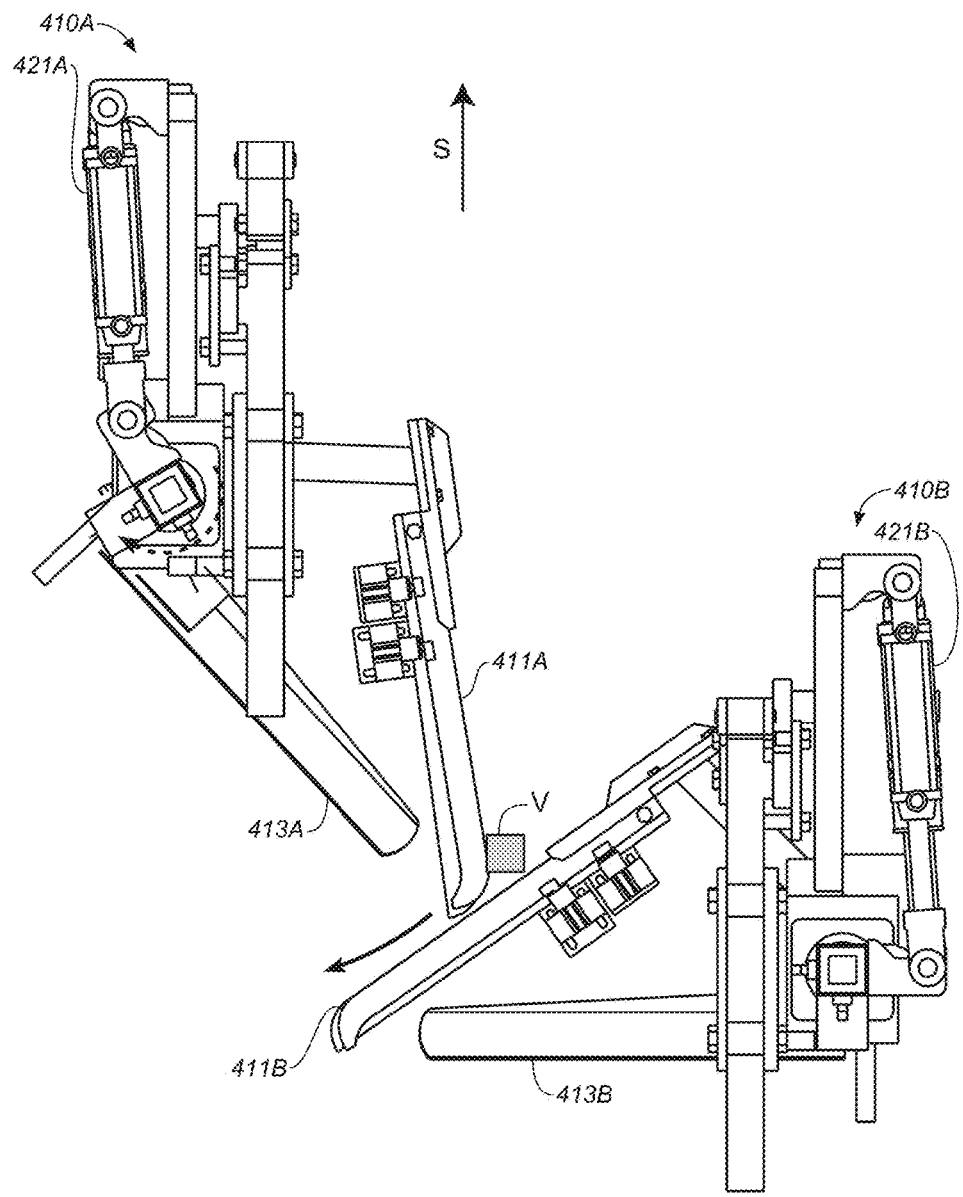

At a slightly later time, as shown in FIG. 9C, vine V continues to contact sensor arm 411A, and switch 803A remains activated, which permits sensor arm 411A, and thus blade 413A, to continue to move away from vine V, as shown by the arrows. Switch 803B is still not activated, and thus hydraulic system 420 is providing full pressure to cylinders 421B, providing sufficient force to blade 413B to weed the soil.

Figure 9D:
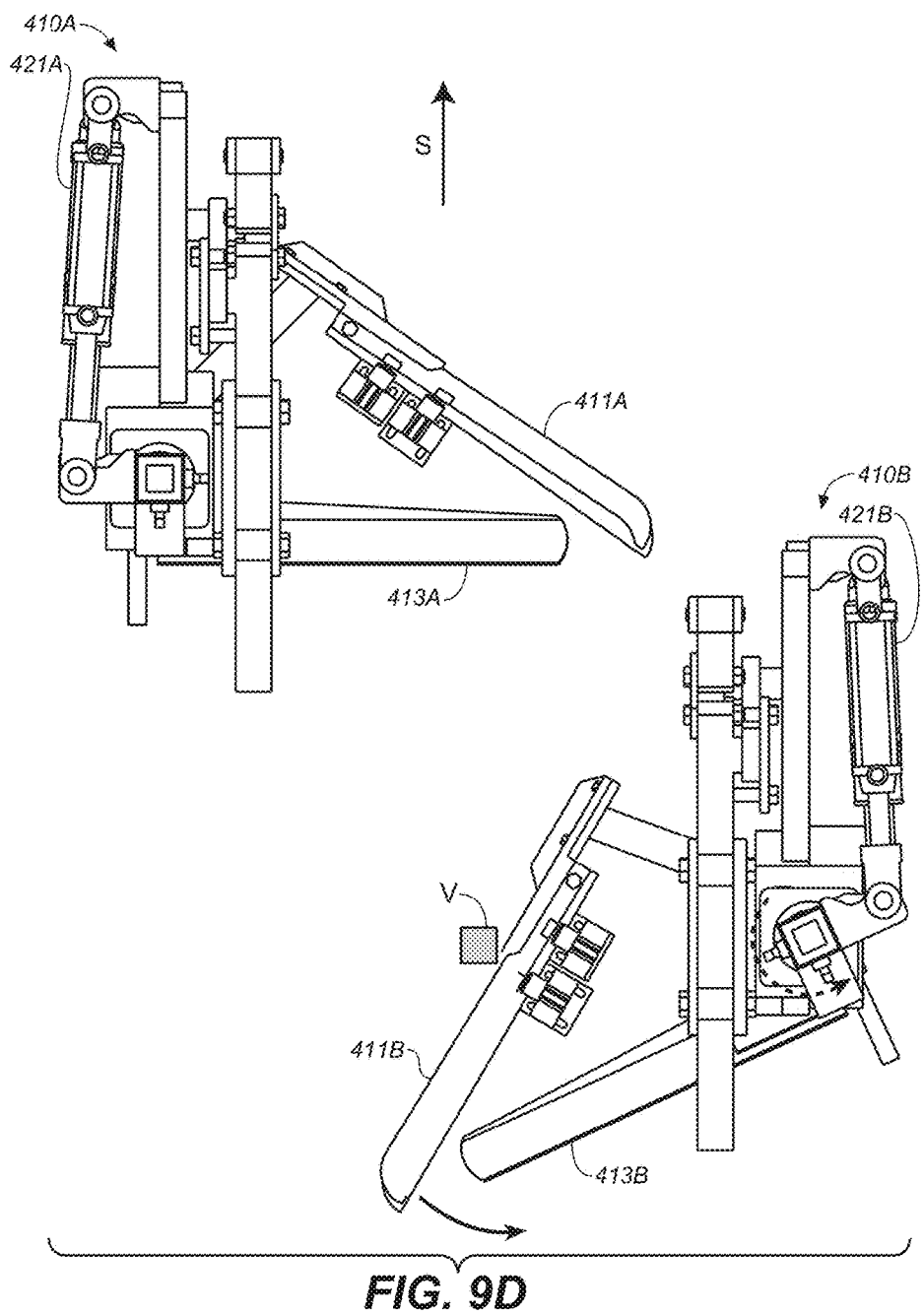

At a slightly later time, as shown in FIG. 9D, vine V has moved past sensor arm 411A. Switch 803A becomes deactivated, causing cylinders 421A to become pressurized. Weeder assembly 410A thus moves back to the same position as in FIG. 9A and blade 413B continues to weed the soil. Vine V has contacted sensor arm 411B, causing switch 803B to be activated. The activation of switch 803B causes release of the pressure in cylinders 421B, which permits sensor arm 411B, and thus blade 413B, to move away from vine V, as shown by the arrows, as apparatus 100 proceeds. Weeder assembly 410B continues to move away from vine V until the vine passes sensor arm 411B, at which time the weeder assembly returns to the configuration that allows blade 413B to weed.

In one embodiment, a compressor, which may be part of compressor and controller 423 or which may be mounted on a tractor, produces 30 to 90 PSI of pressure. The maximum pressure may be adjustable by the controller, or may be adjustable by a valve (not shown) from the cab of tractor. It has been found by the inventor that an adjustable air pressure allows the apparatus to work under different soil and weed conditions, which require different forces to hold the blade in a weeding configuration—that is, perpendicular to the direction of motion.

When cylinders 421 are provided with this maximum pressure through hydraulic lines 425, blade 413 rotates and/or is his held in the orientation shown, for example, in FIG. 9A. Switches 803 may, in certain embodiments, be normally closed air valves, act to switch air from hydraulic lines 425 to cylinders 421 and/or shock absorber 817. Thus, when one of sensor arm 411 contacts a grape vine, stake, or trellis post, switch 803 opens the hydraulic air circuit, dumping the air pressure load in cylinders 421 which were holding blade 413 in position to cut the weed growth under the grape vines. When this happens, blade 413 rotates at apparatus 100 moves forward, causing sensor arm 411 and the blade to rotate, as shown with respect to weeder assembly 410A in FIGS. 9B and C. In certain embodiments, shock absorber 817 provides a slight pressure which slightly holds sensor arm 411 against the grape vine, stake, or trellis post. Once sensor arm 411 passes the vine/stake, switch 803 returns to the normally open position, cylinders 421 are re-pressurized, and sensor arm 411 and blade 413 returns to a position for weeding the soil.

In addition to weeding and spraying adjacent rows of vines, apparatus 100 may also include other devices attached to the apparatus which can perform other actions, such as trimming, thinning and other removal of excess portions of the grape vine foliage or harvesting the grapes. Thus, for example and without limitation, left frame 121 may have equipment attached for tending to one side or the other of the vines in left row $R_L$, and/or one or more of right frame 121 may have equipment attached for tending to one side or the other of the vines in right row $R_R$. Thus, for example, FIG. 5 shows a left fan 52 on left frame 121 and a right fan 53 or right frame 131. In one embodiment, fans 52 and 53 have blades that provide air flow from the vines, through the fans, and away from apparatus 100. In an alternative embodiment, fans 52 and 53 have blades that provide air flow towards the vines. In either case, fans 52 and 54 facilitate leaf removal in the fruiting zone, replacing the action normally done by hand.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

We claim:

1. A device for the simultaneous tending of a left row of vines and an adjacent right row of vines, said device comprising:

a frame having a front and a rear defining a longitudinal axis;

a left linkage attached to said frame;

a left portion supported by said left linkage, where said left portion has a longitudinal axis, where said left linkage constrains said left portion to move relative to the frame with an orientation perpendicular to the ground and with the longitudinal axis of said left portion parallel to the longitudinal axis of said frame, where said left portion includes a pair of left rails spaced apart to accept the left row of vines, where said left linkage constrains said left portion at said left linkage to move in a direction lateral to the longitudinal axis of said frame with said pair of left rails aligned with the longitudinal axis of said frame, and where said left portion includes a left-side device for tending to the left row of vines;

a right linkage attached to said frame; and a right portion supported by said right linkage, where said right portion has a longitudinal axis, where said right linkage constrains said right portion to move relative to the frame with an orientation perpendicular to the ground and with the longitudinal axis of said right portion parallel to the longitudinal axis of said frame, where said right portion includes a pair of rails spaced apart to accept the right row of vines, where said right linkage constrains said right portion at said right linkage to move in a direction lateral to the longitudinal axis of said frame with said pair of right rails aligned with the longitudinal axis of said frame, and where said right portion includes a right-side device for tending to the right row of vines, such that when the device is moved along the longitudinal axis of said frame with said left row of vines disposed between said pair of left rails and with said right row of vines disposed between said pair of right rails, said left portion and said right portion move automatically and independently relative to said frame in an orientation perpendicular to the ground with a transverse spacing between said left portion and said right portion determined by the spacing of the left row of vines and said right row of vines.

2. The device of claim 1, where said left linkage includes a first left linkage near the front of said frame and a second left linkage near the rear of said frame, and where said right linkage includes a first right linkage near the front of said frame and a second right linkage near the rear of said frame.

3. The device of claim 1 where said left-side device includes a left weeder assembly for weeding the soil of the left row of vines, and where said right-side device includes a right weeder assembly for weeding the soil of the right row of vines.

4. The device of claim 3, where said left weeder assembly and said right weeder assembly each include at least one blade for weeding and a sensor to move each of said at least one blade to prevent said at least one blade from touching vines.

5. The device of claim 4, where said left weeder and said right weeder assembly both include a compressed air supply, an hydraulic cylinder, a sensor arm including a switch that controls the delivery of compressed air from said compressed air supply to said hydraulic cylinder, where said left weeder assembly and said right weeder assembly both have a first configuration wherein said switch provides compressed air to said hydraulic cylinder to maintain each of said at least one blade in an orientation that is generally perpendicular to the longitudinal axis of said frame and positioned to remove weeds in the ground, and a second configuration wherein said switch allows compressed air to escape from said hydraulic cylinder to allow said at least one blade to rotate away from the generally perpendicular orientation to to the longitudinal axis of said frame.

6. The device of claim 4, where said at least one blade is two blades.

7. The device of claim 1, further including a spray system to spray the left row of vines and the right row of vines.

8. The device of claim 7, where said spray system includes nozzles, and further including a control mechanism to sense when a vine is in the vicinity of nozzles and to direct the spray at the vines.

9. The device of claim 7, where said spray system includes a reservoir to contain a liquid including nutrients and nozzles to direct the nutrients to the vines.

10. The device of claim 7, where said spray system includes a reservoir to contain a pest control liquid, and nozzles to direct the pest control liquid to locations to the vines.

11. The device of claim 1 further including:

a left fan on said left portion directing a flow of air from a vine of the left row of vines into the left fan; and a right fan on said right portion directing a flow of air from a vine of the right row of vines into the right fan.

12. The device of claim 1, where said left linkage includes a left front linkage and a left rear linkage, where said left front linkage is rotatably attached to said frame proximal to said front and configured to rotate about a first axis perpendicular to the ground, and where said left rear linkage is rotatably attached to said frame proximal to said rear and configured to rotate about a second axis perpendicular to the ground, and where said left portion is rotatably attached to said left front linkage and said left rear linkage; and where said right linkage includes a right front linkage and a right rear linkage, where said right front linkage is rotatably attached to said frame proximal to said front and configured to rotate about a third axis perpendicular to the ground, and where said right rear linkage is rotatably attached to said frame proximal to said rear and configured to rotate about a fourth axis perpendicular to the ground, and where said right portion is rotatably attached to said right front linkage and said right rear linkage.

* * * * *